(12) United States Patent  
Stanton

(10) Patent No.: US 8,984,154 B2  
(45) Date of Patent: Mar. 17, 2015

(54) SYSTEM AND METHOD FOR SYNCHRONIZING SIMULTANEOUS MEDIA STREAM PLAYBACK ACROSS NONSYNCHRONIZED NETWORK TIMING/CLOCK ISLANDS

(75) Inventor: Kevin B. Stanton, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 243 days.

(21) Appl. No.: 11/864,582

(22) Filed: Sep. 28, 2007

(65) Prior Publication Data

US 2009/0089456 A1   Apr. 2, 2009

(51) Int. Cl.
*G06F 15/16*   (2006.01)
*H04J 3/06*   (2006.01)
*H04L 29/06*   (2006.01)

(52) U.S. Cl.
CPC ............ *H04J 3/0667* (2013.01); *H04J 3/0632* (2013.01); *H04L 69/28* (2013.01); *Y02B 60/43* (2013.01)
USPC ........................................ 709/231; 455/456.3

(58) Field of Classification Search
CPC ..... H04L 65/602; H04L 45/24; H04L 45/126; H04W 3/008
USPC ................ 709/231, 203, 217, 219; 455/456.3
See application file for complete search history.

(56) References Cited

U.S. PATENT DOCUMENTS

| | | | |
|---|---|---|---|
| 7,194,010 B2 * | 3/2007 | Beasley et al. | 370/503 |
| 7,454,218 B2 * | 11/2008 | Mo et al. | 455/502 |
| 8,144,711 B1 * | 3/2012 | Pegrum et al. | 370/394 |
| 2002/0018475 A1 * | 2/2002 | Ofek et al. | 370/400 |
| 2002/0080828 A1 * | 6/2002 | Ofek et al. | 370/539 |
| 2002/0080829 A1 * | 6/2002 | Ofek et al. | 370/539 |
| 2006/0156375 A1 * | 7/2006 | Konetski | 725/135 |
| 2007/0180137 A1 * | 8/2007 | Rajapakse | 709/231 |
| 2007/0226530 A1 * | 9/2007 | Celinski et al. | 713/500 |
| 2008/0112439 A1 * | 5/2008 | Vestal | 370/516 |

(Continued)

FOREIGN PATENT DOCUMENTS

| | | |
|---|---|---|
| CN | 101415071 A | 4/2009 |
| DE | 102008048649 A1 | 4/2009 |

OTHER PUBLICATIONS

Mills, David L. "Network Time Protocol (Version 3) Specification, Implimentation and Analysis." [Retreived online on Nov. 10, 2009] Mar. 1992. [Retreived from the Internet] <URL: http://tools.ietf.org/pdf/rfc1305.pdf>.*

(Continued)

*Primary Examiner* — Frantz Jean
(74) *Attorney, Agent, or Firm* — Garrett IP, LLC

(57) ABSTRACT

A system and method for synchronizing simultaneous media stream playback across disjoint network timing/clock islands. An embodiment of a method includes determining a closest device to a source device in a network communications path between the source device and one or more target devices. Here, clocks of the closest device and the one or more target devices are synchronized and a clock of the source device is not necessarily synchronized with the clocks of the closest device and the one or more target devices. A current time for the closest device is then determined. A start time is assigned to at least the current time plus a maximum latency across the network communications path. A data stream and the start time are sent to the one or more target devices for rendering. Other embodiments are described and claimed.

20 Claims, 3 Drawing Sheets

(56) References Cited

U.S. PATENT DOCUMENTS

| | | | |
|---|---|---|---|
| 2008/0144515 A1* | 6/2008 | Ouellette et al. | 370/242 |
| 2008/0168470 A1* | 7/2008 | Bushell et al. | 719/313 |
| 2009/0015304 A1* | 1/2009 | Yin et al. | 327/162 |

OTHER PUBLICATIONS

Congdon, Paul. "Link Layer Discovery Protocol and MIB." [Retreived online on Nov. 10, 2009] Mar. 7, 2002. [Retreived from the Internet] <URL: http://www.ieee802.org/1/files/public/docs2002/lldp-protocol-00.pdf>.*

Office Action issued in corresponding Chinese application, 200810178573.8, mailed Aug. 3, 2011; 10 pages.

Office Action received for Chinese Patent Application No. 200810178573.8, mailed on Dec. 27, 2013, 10 pages of Office Action including 6 pages of English Translation.

Office Action Received for Chinese Patent application No. 200810178573.8, mailed on May 20, 2013, 7 pages of Office Action including 4 pages of English Translation.

Office Action Received for Chinese Patent application No. 200810178573.8, mailed on Nov. 26, 2010, 4 pages of Office Action and 5 pages of English Translation.

Office Action Received for German Patent application No. 10 2008 048 649.3, mailed on Apr. 17, 2012, 7 pages of Office Action and 6 pages of English Translation.

Walker, Mark et al., "RemoteUIServerDevice:1 Device Template Version 1.01", for UPnP™ Version 1.0, Standardized DCP, Sep. 2, 2004, 11 pages.

Ee, Jan Van et al., "RemoteUIServer:1 Service Template Version 1.01", for UPnP™ Version 1.0, Standardized DCP, Sep. 2, 2004, 20 pages.

Iyer, Prakash et al., "InternetGatewayDevice:1 Device Template Version 1.01", for UPnP™ Version 1.0, Standardized DCP, Nov. 12, 2001, 15 pages.

Warrier, Ulnas et al., "LANDevice:1 Device Template Version 1.01", for UPnP™ Version 1.0, Standardized DCP, Nov. 12, 2001, 9 pages.

Blaszczak, Mike et al., "LANHostConfigManagement:1 Service Template Version 1.01", for UPnP™ Version 1.0, Standardized DCP, Nov. 12, 2001, 27 pages.

Iyer, Prakash et al., "Layer3Forwarding:1 Service Template Version 1.01", for UPnP™Version 1.0, Standardized DCP, Nov. 12, 2001, 14 pages.

Schmitz, Matthew et al., "WANCableLinkConfig:1 Service Template Version 1.01", for UPnP™ Version 1.0, Standardized DCP, Nov. 12, 2001, 25 pages.

Warrier, Ulnas et al., "WANCommonInterfaceConfig:1 Service Template Version 1.01", for UPnP™ Version 1.0, Standardized DCP, Nov. 12, 2001, 24 pages.

Pennerath, Frédéric, "WANConnectionDevice:1 Device Template Version 1.01", for UPnP™ Version 1.0, Standardized DCP, Nov. 12, 2001, 13 pages.

Warrier, Ulhas et al., "WANDevice:1 Device Template Version 1.01", for UPnP™ Version 1.0, Standardized DCP, Nov. 12, 2001, 12 pages.

Pennerath, Frédéric, "WANDSLLinkConfig:1 Service Template Version 1.01", for UPnP™ Version 1.0, Standardized DCP, Nov. 12, 2001, 27 pages.

Iyer, Prakash, "WANEthernetLinkConfig:1 Service Template Version 1.01", for UPnP™ Version 1.0, Standardized DCP, Nov. 12, 2001, 10 pages.

Schmitz, Matthew et al., "WANIPConnection:1 Service Template Version 1.01", for UPnP™ Version 1.0, Standardized DCP, Nov. 12, 2001, 74 pages.

Warrier, Ulhas, "WANPOTSLinkConfig:1 Service Template Version 1.01", for UPnP™ Version 1.0, Standardized DCP, Nov. 12, 2001, 21 pages.

Presser, Alan et al., "UPnP™ Device Architecture 1.1", Oct. 15, 2008, 136 pages.

Allegro Software Development Corporation, et al., "UPnP Device Architecture 1.0", Apr. 24, 2008, 80 pages.

Warrier, Ulhas et al., "WANPPPConnection:1 Service Template Version 1.01", for UPnP™ Version 1.0, Standardized DCP, Nov. 12, 2001, 89 pages.

Ritchie, John et al., "ContentSync:1 Service Template Version 1.01", for UPnP™ Version 1.0, Standardized DCP, Jul. 14, 2009, 111 pages.

Nguyen, Bich et al., "InboundConnectionConfig:1 Service", for UPnP™ Version 1.0, Standardized DCP, Document Version: 1.0, Service Template Version: 2.00, Sep. 30, 2009, 21 pages.

Russell, Bill et al., "Remote Access Architecture:1", for UPnP™ Version 1.0, Standardized DCP, Document Version: 1.0, Service Template Version: 2.00, Sep. 30, 2009, 30 pages.

Nguyen, Bich et al., "RAClient:1 Device", for UPnP™ Version 1.0, Standardized DcCP, Document Version: 1.0, Device Template Version: 2.00, Sep. 30, 2009, 13 pages.

Nguyen, Bich et al., "RADAConfig:1 Service", for UPnP™ Version 1.0, Standardized DCP, Document Version: 1.0, Service Template Version: 2.00, Sep. 30, 2009, 20 pages.

Microsoft Corporation, "UPnP Device Architecture © 1999-2002 V1.0 Annex A—IP Version 6 Support", 2002, 11 pages.

Lawrence, Scott, "Basic:1.0 Device Definition Version 1.0", for UPnP™ Version 1.0, Template Design Complete, Dec. 12, 2002, 7 pages.

Saint-Hilaire, Ylian et al., "RemoteUIClientDevice:1 Device Template Version 1.01", for UPnP™ Version 1.0, Standardized DCP, Sep. 2, 2004, 11 pages.

Saint-Hilaire, Ylian et al., "RemoteUIClient:1 Service Template Version 1.01", for UPnP™ Version 1.0, Standardized DCP, Sep. 2, 2004, 29 pages.

"DeviceType:V Device Template Version 1.01", for UPnP™ Version 1.0, [Design Start (TDS); Preliminary Design (TPD); Design Complete V.9 (TDC); Approved], Jan. 16, 2001, 11 pages.

"ServiceType:V Service", for UPnP™ Version 1.0, New Project Proposal (NP)|Working Draft (WD)|Committee Draft (CD)|Final Committee Draft (FCD)|Proposed DCP (PDCP)|Standardized DCP (SDCP), Service Template Version 2.00., 2008, 27 pages.

Timing and Synchronization for Time-Sensitive Applications in Bridged Local Area Networks, IEEE P802.1AS/D7.2, (Aug. 18, 2010), 294 pages.

Office Action received for Chinese Application No. 200810178573.8, mailed on Mar. 2, 2010, 4 Pages of Office Action and 6 Pages of English Translation.

Notice of Allowance Received for Chinese Patent Application No. 200810178573.8, mailed on Jul. 7, 2014, 4 pages of Notice of Allowance and 2 pages of English Translation.

* cited by examiner

SYSTEM AND METHOD FOR SYNCHRONIZING SIMULTANEOUS MEDIA STREAM PLAYBACK ACROSS NONSYNCHRONIZED NETWORK TIMING/CLOCK ISLANDS

BACKGROUND

Accurate time or clock synchronization and frequency accuracy/stability are required when multiple devices render related content. Examples of such related content include, but are not limited to, audio and video (lip-synchronization); audio and audio (networked stereo speakers); and so forth.

But sometimes accurate time or clock synchronization and frequency stability across the entire network is neither present nor necessary, for example when only a part of the network supports an accurate time protocol and the stream source needs only an estimate of the current time so that it can, for example, tell the speakers (which are accurately synchronized) to start the stream. Network technologies may include, but are not limited to, Ethernet (Institute of Electrical and Electronics Engineers (IEEE) 802.3 standard), Wireless (IEEE 802.11 standard) and Powerline (HomePlug AV (HPAV)).

DETAILED DESCRIPTION

Various embodiments may be generally directed to a system and method for synchronizing simultaneous media stream playback across disjoint network timing/clock islands. Embodiments of the invention allow networked devices that support a time synchronization protocol to render synchronized audio/video or audio/audio (e.g., two or more speakers) even when the entire network does not support the time synchronization protocol. Examples of time synchronization protocols may include, but are not limited to, IEEE 802.1AS, IEEE 1588 and Network Time Protocol (NTP). Other embodiments may be described and claimed.

Various embodiments may comprise one or more elements or components. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Figure 1:
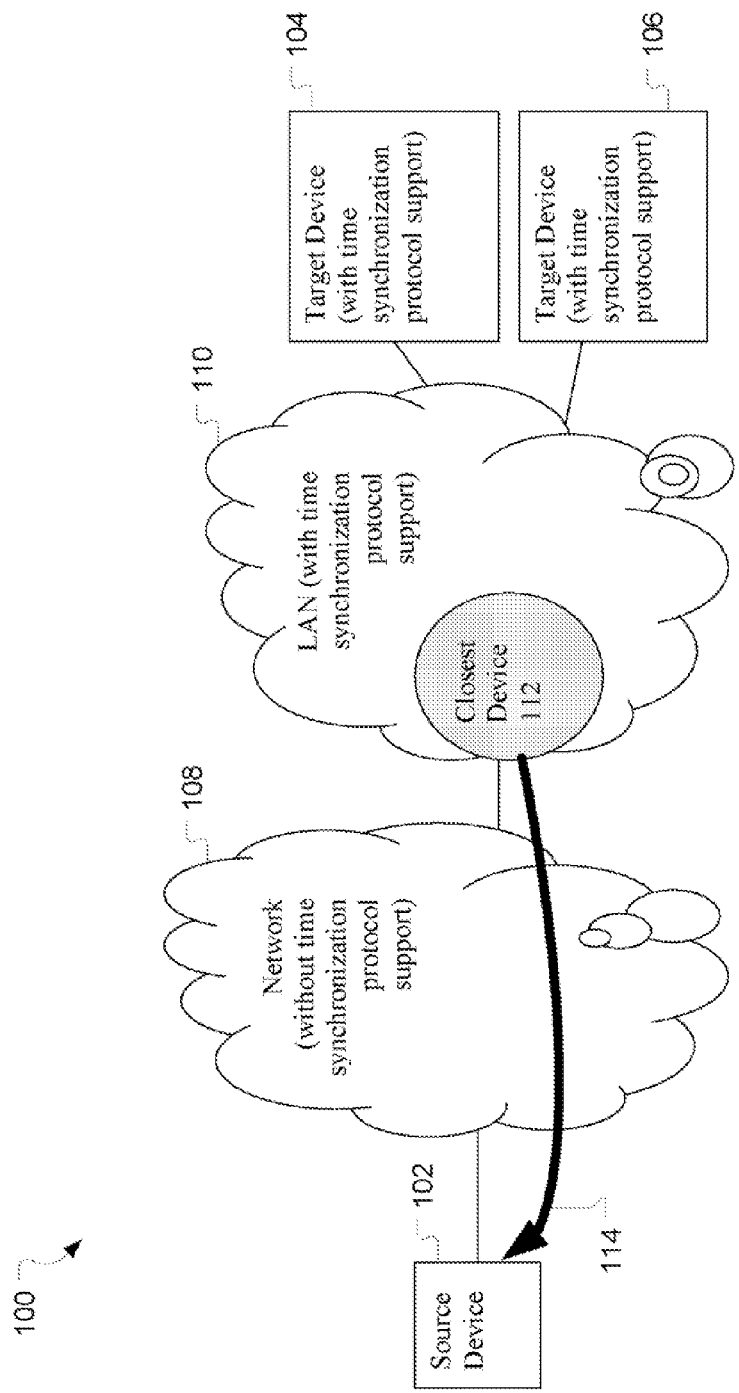
FIG. 1 illustrates one embodiment of an environment.

FIG. 1 illustrates one embodiment of an environment 100 for synchronizing simultaneous media stream playback across disjoint network timing/clock islands. In embodiments, environment 100 consists of multiple heterogeneous network technologies. Such network technologies may include, but are not limited to, Ethernet (IEEE 802.3 standard), Wireless (IEEE 802.11 standard) and Powerline (HomePlug AV (HPAV)).

As illustrated in the embodiment of FIG. 1, a network 108 and a local area network (LAN) 110 make up an example communications path between a source device 102 and target devices 104 and 106. In embodiments, network 108 (e.g., the Internet) includes devices or elements that do not support a time synchronization protocol. LAN 110 includes devices or elements that do support a time synchronization protocol, or support only an inaccurate time synchronization protocol. Thus, environment 100 is likely to have disjoint network timing/clock islands due to some devices in environment 100 having synchronized clocks (like in LAN 110) and some devices not having synchronized clocks (like in network 108). Examples of time synchronization protocols may include, but are not limited to, IEEE 802.1AS, IEEE 1588 and Network Time Protocol (NTP). In embodiments, the IEEE standard of 802.1AS time synchronization may be utilized to synchronize device clocks to within a few microseconds ($10^{-6}$ seconds) of each other.

Source device 102, which may or may not support a time synchronization protocol, needs to transmit one or more related media data streams to target devices 104 and 106 for synchronized rendering. Target devices 104 and 106 are assumed to support a time synchronization protocol and, in embodiments, their clocks are synchronized directly with each other. Target devices 104 and 106 may be any audio and/or video device capable of rendering media data including, but not limited to, a speaker, a personal computer, a laptop, a personal digital assistant (PDA), an audio/video tuner, a microphone, a video display, and so forth. Although there are two target devices illustrated in FIG. 2, the invention is not limited to this.

As described above, source device 102 needs to transmit one or more related media data streams to target devices 104 and 106 for synchronized rendering. Typically, source device 102 would forward to target devices 104 and 106 the media data streams to be rendered, along with a "start time". The "start time" informs target devices 104 and 106 when to start or resume rendering of the data in order to render it in the correct synchronized manner.

Typically, source device 102 would set the "start time" to be greater than the current clock time plus the maximum latency across the network communications path separating source device 102 and target devices 104 and 106. But, as described above, the current clock time is not the same for every device in environment 100 due to its disjoint network timing/clock islands. Thus, unless source device 102 and target devices 104 and 106 support the same time synchronization protocol, it is assumed that their clocks are not synchronized. But, in embodiments, it is assumed that target devices 104 and 106 and one or more devices in the communication path between them (e.g., in LAN 110) support the same time synchronization protocol. Thus, in order for source device 102 to provide target devices 104 and 106 with a good-enough estimate of the "start time", device 102 needs to know the clock time or "current time" known to devices attached to LAN 110 or in the communication path between source device 102 and target devices 104 and 106.

In embodiments, for source device 102 to determine the clock time or "current time" of target devices 104 and 106, it determines the "closest device" to device 102 in the communications path that supports the same time synchronization protocol as target devices 104 and 106 and asks the "closest device" what time it is (i.e., requests its "current time"). In embodiments, source device 102 determines the "closest device" using a protocol such as Layer Discovery Protocol (LLDP) or an Universal Plug and Play (UPnP) protocol. In the example illustrated in FIG. 1, closest device 112 is the "closest device". Here, closest device 112 would forward its "current time" or "now" 114 to source device 102. In embodiments, asking the "closest device" what time it is could be realized, for example, by asking the "closest device" to send the current time periodically, by asking the "closest device" what time it is and waiting for the response, or through other means such as NTP.

If the clock of source device 102 is synchronized with the clocks of target devices 104 and 106 (i.e., device 102 and target devices 104 and 106 support the same time synchronization protocol and thus their clocks are synchronized), then device 102 is considered to be the "closest device" and embodiments of the invention reduce to standard time synchronized behavior (e.g., standard IEEE 802.1AS behavior). If no other device in environment 100 supports the same time synchronization protocol as target devices 104 and 106, then embodiments of the invention reduce to standard NTP-behavior where no assistance is available to source device 102 in determining a better estimate of "current time". Thus, as the "closest device" gets closer and closer to source device 102, the estimate of "current time" or "now" gets better and better.

Since closest device 112 and target devices 104 and 106 support the same time synchronization protocol, the clock time or "current time" of closest device 112 and target devices 104 and 106 is the same. Here, source device 102 can now set the "start time" for target devices 104 and 106 to start or resume rendering the media data streams to at least the "current time" provided by closest device 112 plus the maximum latency across the network communications path separating source device 102 and target devices 104 and 106. Since this maximum latency time is typically much greater than the time accuracy requirement of target devices that render related media data, the source device's estimate of "start time" provided to the target devices is adequate for the target devices to render the media data streams in a synchronized manner.

In various embodiments, environment 100 may be implemented via wireless technologies, wired technologies, or a combination of both. The types of network technologies and devices shown in FIG. 1 are provided for illustration purposes only and are not meant to limit the invention.

The various devices illustrated in FIG. 1 may incorporate wireless functionality, wired functionality, or a combination of both. For example, when implemented with wireless functionality, a device may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum, and so forth. When implemented with wired functionality, a device may include components and interfaces suitable for communicating over wired communications media, such as input/output (I/O) adapters, physical connectors to connect the I/O adapter with a corresponding wired communications medium, a network interface card (NIC), and so forth. Examples of wired communications media may include a wire, cable, metal leads, printed circuit board (PCB), backplane, switch fabric, semiconductor material, twisted-pair wire, co-axial cable, fiber optics, and so forth.

Figure 2:
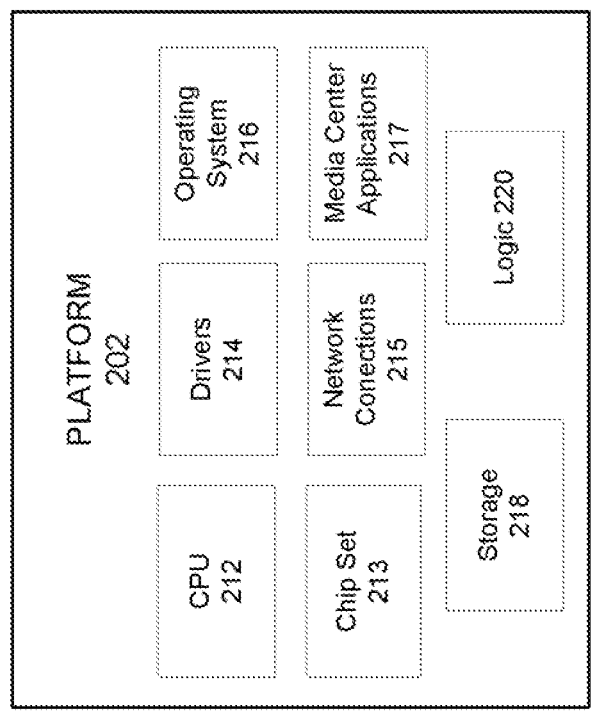
FIG. 2 illustrates one embodiment of a source device.

FIG. 2 illustrates an embodiment of source device 102. In one embodiment, device 102 may comprise or may be implemented as a media platform 202 such as the Viiv™ media platform made by Intel® Corporation. In one embodiment, platform 202 may receive data flow requests from one or more of the devices in environment 100.

In one embodiment, platform 202 may comprise a CPU 212, a chip set 213, one or more drivers 214, one or more network connections 215, an operating system 216, and/or one or more media center applications 217 comprising one or more software applications, for example. Platform 202 also may comprise storage 218 and logic 220.

In one embodiment, CPU 212 may comprise one or more processors such as dual-core processors. Examples of dual-core processors include the Pentium® D processor and the Pentium® processor Extreme Edition both made by Intel® Corporation, which may be referred to as the Intel® Core Duo® processors, for example.

In one embodiment, chip set 213 may comprise any one of or all of the Intel® 945 Express Chipset family, the Intel® 955X Express Chipset, Intel® 975X Express Chipset family, plus ICH7-DH, ICH7-MDH, ICH8 or ICH9 controller hubs, which all are made by Intel® Corporation.

In one embodiment, drivers 214 may comprise the Quick Resume Technology Drivers made by Intel® to enable users to instantly turn on and off platform 202 like a television with the touch of a button after initial boot-up, when enabled, for example. In addition, chip set 213 may comprise hardware and/or software support for 5.1 surround sound audio and/or high definition 7.1 surround sound audio, for example. Drivers 214 may include a graphics driver for integrated graphics platforms. In one embodiment, the graphics driver may comprise a peripheral component interconnect (PCI) Express graphics card.

In one embodiment, network connections 215 may comprise the PRO/1000 PM or PRO/100 VE/VM network connection, both made by Intel® Corporation.

In one embodiment, operating system 216 may comprise the Windows® XP Media Center made by Microsoft® Corporation. In one embodiment, one or more media center applications 217 may comprise a media shell to enable users to interact with a remote control from a distance of about 10-feet away from platform 202 or a display device, for example. In one embodiment, the media shell may be referred to as a "10-feet user interface," for example. In addition, one or more media center applications 217 may comprise the Quick Resume Technology made by Intel®, which allows instant on/off functionality and may allow platform 202 to stream content to media adaptors when the platform is turned "off."

In one embodiment, storage 218 may comprise the Matrix Storage technology made by Intel® to increase the storage performance enhanced protection for valuable digital media when multiple hard drives are included. In one embodiment, logic 220 enables the functionality of source device 102 as described herein. The embodiments, however, are not limited to the elements or in the context shown or described in FIG. 2.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof.

Figure 3:
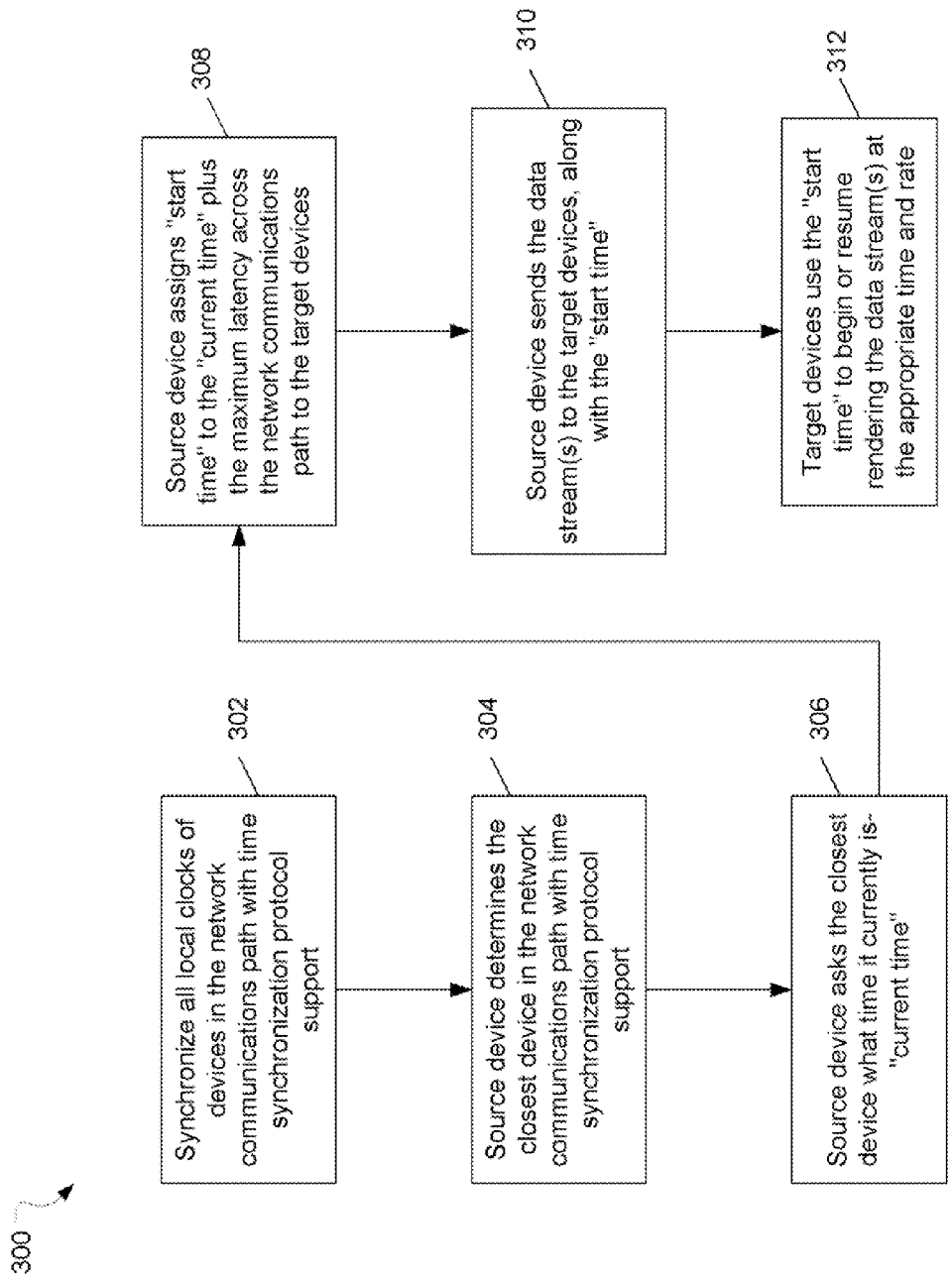
FIG. 3 illustrates one embodiment of a logic flow.

FIG. 3 illustrates one embodiment of a logic flow 300. As shown in logic flow 300, it is assumed that all local clocks of the devices in a network communications path between source device 102 and target devices 104 and 106 that support the same time synchronization protocol are synchronized (block 302).

Source device 102 determines the "closest device" in the network communications path that supports the same time synchronization protocol as target devices 104 and 106 (block 304). In embodiments, source device 102 determines the "closest device" using a protocol such as LLDP or UPnP protocol.

Source device 102 asks the "closest device" what time it currently is (i.e., "current time" or "now") (block 306).

Source device 102 then assigns the "start time" to at least the "current time" plus the maximum latency across the network communications path (block 308).

Source device 102 sends the data stream(s) to target devices 104 and 106, along with the "start time" (block 310).

Target devices 104 and 106 use the "start time" to begin or resume rendering the data stream(s) at the appropriate time and rate (block 312). Embodiments of the invention, however, are not limited to the context shown or described in FIG. 3.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate arrays (FPGA), logic gates, registers, semiconductor devices, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or rewriteable media, digital or analog media, hard disk, floppy disk. Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing" "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method, comprising:
   determining, by a source device, a closest device to the source device in a network communications path between the source device and one or more target devices, wherein the target devices represent audio or video devices capable of rendering media data, and wherein clocks of the closest device and the one or more target devices are synchronized and wherein a clock of the source device is not synchronized with the clocks of the closest device and the one or more target devices;
   determining a current time for the closest device;
   assigning a start time to be at least the current time plus a maximum latency across the network communications path, wherein the start time represents the time at which the target devices are to render the media data; and
   sending the media data and the start time to the one or more target devices,
   wherein the closeness of the closest device to the source device represents proximity in the topology of the network, and
   wherein said determining of the closest device, said determining of the current time, said assigning, and said sending are performed by the source device.

2. The method of claim 1, wherein the one or more target devices are configured to use the start time to render the media data.

3. The method of claim 1, wherein the clocks of the closest device and the one or more target devices are synchronized with one of an Institute of Electrical and Electronics Engineers (IEEE) 802.1AS time synchronization protocol, an IEEE 1588 time synchronization protocol and a Network Time Protocol (NTP) time synchronization protocol.

4. The method of claim 1, wherein the closest device is determined via one of a Link Layer Discovery Protocol (LLDP) and a Universal Plug and Play (UPnP) protocol.

5. The method of claim 1, wherein the one or more target devices are each one of a speaker, a personal computer, a printer, a laptop computer, a personal digital assistant (PDA), an audio/video tuner and a microphone.

6. A system, comprising:
a source device;
one or more target devices wherein the target devices represent audio or video devices capable of rendering media; data;
a network communications path between the source device and one or more target devices; and
a closest device in the network communications path to a source device in the network communications path between the source device and the one or more target devices, the closest device determined by the source device,
wherein the closeness of the closest device to the source device represents proximity in the topology of the network, wherein clocks of the closest device and the one or more target devices are synchronized, wherein a clock of the source device is not synchronized with the clocks of the closest device and the one or more target devices, wherein the source device is configured to determine a current time for the closest device, wherein the source device is configured to assign a start time to be at least the current time plus a maximum latency across the network communications path, wherein the start time represents the time at which the target devices are to render the media data and wherein the source device is configured to send the media data and the start time to the one or more target devices.

7. The system of claim 6, wherein the one or more target devices are configured to use the start time to render the media data.

8. The system of claim 6, wherein the clocks of the closest device and the one or more target devices are synchronized with one of an Institute of Electrical and Electronics Engineers (IEEE) 802.1AS time synchronization protocol, an IEEE 1588 time synchronization protocol and a Network Time Protocol (NTP) time synchronization protocol.

9. The system of claim 6, wherein the closest device is determined via one of a Link Layer Discovery Protocol (LLDP) and a Universal Plug and Play (UPnP) protocol.

10. The system of claim 6, wherein the one or more target devices are each one of a speaker, a personal computer, a printer, a laptop computer, a personal digital assistant (PDA), an audio/video tuner and a microphone.

11. An apparatus, comprising:
a processor to determine a closest device to the processor in a network communications path between the processor and one or more target devices, wherein the target devices represent audio or video devices capable of rendering media data,
wherein the closeness of the closest device to the processor represents proximity in the topology of the network, wherein clocks of the closest device and the one or more target devices are synchronized, wherein a clock of the processor is not synchronized with the clocks of the closest device and the one or more target devices, wherein the processor is configured to determine a current time for the closest device, wherein the processor is configured to assign a start time to be at least the current time plus a maximum latency across the network communications path, wherein the start time represents the time at which the target devices are to render the media data, and wherein the processor is configured to send the media data and the start time to the one or more target devices.

12. The apparatus of claim 11, wherein the one or more target devices are configured to use the start time to render the media data.

13. The apparatus of claim 11, wherein the clocks of the closest device and the one or more target devices are synchronized with one of an Institute of Electrical and Electronics Engineers (IEEE) 802.1AS time synchronization protocol, an IEEE 1588 time synchronization protocol and a Network Time Protocol (NTP) time synchronization protocol.

14. The apparatus of claim 11, wherein the closest device is determined via one of a Link Layer Discovery Protocol (LLDP) and a Universal Plug and Play (UPnP) protocol.

15. The apparatus of claim 11, wherein the one or more target devices are each one of a speaker, a personal computer, a printer, a laptop computer, a personal digital assistant (PDA), an audio/video tuner and a microphone.

16. A non-transitory machine-readable medium containing instructions which, when executed by a processing system, cause the processing system to perform a method, the method comprising:
determining, by a source device, a closest device to the source device in a network communications path between the source device and one or more target devices, wherein the target devices represent audio or video devices capable of rendering media data, and wherein clocks of the closest device and the one or more target devices are synchronized and wherein a clock of the source device is not synchronized with the clocks of the closest device and the one or more target devices;
determining a current time for the closest device;
assigning a start time to be at least the current time plus a maximum latency across the network communications path wherein the start time represents the time at which the target devices are to render the media data; and
sending the media data and the start time to the one or more target devices,
wherein the closeness of the closest device to the source device represents proximity in the topology of the network.

17. The non-transitory machine-readable medium of claim 16, wherein the one or more target devices are configured to use the start time to render the media data.

18. The non-transitory machine-readable medium of claim 16, wherein the clocks of the closest device and the one or more target devices are synchronized with one of an Institute of Electrical and Electronics Engineers (IEEE) 802.1AS time synchronization protocol, an IEEE 1588 time synchronization protocol and a Network Time Protocol (NTP) time synchronization protocol.

19. The non-transitory machine-readable medium of claim 16, wherein the closest device is determined via one of a Link Layer Discovery Protocol (LLDP) and a Universal Plug and a Play (UPnP) protocol.

20. The non-transitory machine-readable medium of claim 16, wherein the one or more target devices are each one of a speaker, a personal computer, a printer, a laptop computer, a personal digital assistant (PDA), an audio/video tuner and a microphone.

\* \* \* \* \*